Patented Nov. 29, 1938

2,138,759

UNITED STATES PATENT OFFICE 2,138,759

DYESTUFFS OF THE ANTHRACENE SERIES AND A PROCESS OF PREPARING THEM

Wilhelm Eckert and Otto Braunsdorf, Frankfort-on-the-Main-Hochst, Germany, assignors to General Aniline Works, Inc., New York, N. Y., a corporation of Delaware No Drawing. Application November 11, 1936, Serial No. 110,404. In Germany November 13, 1935

10 Claims. (Cl. 260—269)

This invention relates to dyestuffs of the anthracene series and a process of preparing them.

We have found that new dyestuffs of the anthracene series may be obtained by condensing in an alkaline medium aceanthrenone, obtainable for instance as described in U. S. Patent No. 2,011,806, which may be characterized by the probable formula:

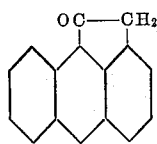

with an isatin compound as, for instance, isatin or a homologue or substitution product of isatin and heating with a caustic alkali the condensation product obtained which may be supposed to have the general formula:

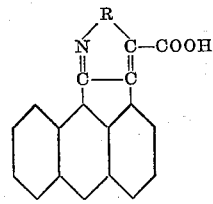

wherein R represents the isocyclic part of the isatin compound used for the reaction.

The constitution of these new products has not been ascertained. They are green dyestuffs which dye substantively vegetable fiber, such as cotton, artificial silk or the like under the usual conditions and are distinguished by a great clearness of the green shade obtained.

The following examples serve to illustrate the invention, but they are not intended to limit it thereto, the parts are by weight unless otherwise stated, the ratio of parts by weight to parts by volume is that which exists between the kilo and the liter.

(1) 16 parts of isatin and 22 parts of aceanthrenone are mixed while stirring in 600 parts by volume of alcohol. 60 parts by volume of caustic soda solution of 40° Bé. are then added and the whole is heated to boiling in a reflux apparatus for about 24 hours. After this lapse of time a dark-brown solution is obtained. In order to isolate the product the solution is strongly diluted with water, filtered from a small quantity of an insoluble by-product and mixed at boiling temperature with a mineral acid. The condensation product is precipitated in the form of red-brown flakes, which are filtered with suction and washed with hot water. After drying, a red-brown powder is obtained which, when heated, assumes a dark coloration at about 200° C., sinters and finally melts with decomposition. It dissolves in concentrated sulfuric acid to a reddish-yellow solution. The product dissolves in dilute alkalies and alkali carbonate solutions to yellow solutions; the alkaline solutions show a feebly greenish fluorescence. The compound may be purified by recrystallization from glacial acetic acid.

Into a melt of 150 parts of caustic potash and 120 parts of ethyl alcohol there are introduced at about 110° C.–120° C., 15 parts of the condensation product of aceanthrenone and isatin obtained according to the above process and corresponding with the following probable formula:

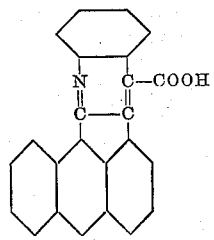

The melt soon becomes green. The temperature is gradually raised, kept at 150° C.–160° C. for some time and finally raised to 180–200° C. The product gradually separates in the form of a dark-green mass, floating on the molten caustic alkali. As soon as a test sample of the melt dissolves in concentrated sulfuric acid to a greenish solution, the product is separated from the alkali and dissolved in water, the dark-green solution is filtered, boiled and the dyestuff is precipitated in the form of its sodium salt at boiling temperature by means of a saturated solution of sodium chloride. It is a dark green precipitate which dissolves in water to a clear green solution; it dissolves in concentrated sulfuric acid to a greenish solution. From the aqueous solution cotton and viscose artificial silk are substantively dyed according to the usual dyeing prescriptions very clear green shades.

(2) 12 parts of 5.7-dichlorisatin are dissolved, while heating, in 300 parts of ethyl alcohol, mixed with 35 parts of caustic soda solution of 40° Bé. 11 parts of aceanthrenone are then added and the whole is heated to boiling in a reflux apparatus, while stirring, for about 24 hours. The dark-brown solution thus produced is strongly diluted with water, filtered and acidified at boiling temperature. The crude product which is precipitated in the form of brown flakes is filtered with suction and washed with hot water until neutral. In order to purify the product the sodium salt is advantageously prepared by dissolving the crude product in hot dilute sodium carbonate solution. The pale yellow solution is cooled whereupon the sodium salt crystallizes in the form of pointed thin light-yellow laminae.

10 parts of condensation product of aceanthrenone and 5.7-dichlorisatin, obtainable according to the above process, which may be characterized by the probable formula:

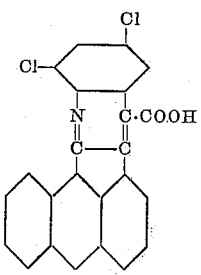

are introduced at about 120° C. into a melt of 100 parts of caustic potash and 80 parts of ethyl alcohol. The temperature is then raised to about 180° C.–190° C. and kept there until a further darkening of the color can no longer be observed. In order to obtain the dyestuff the melt is dissolved in water, the dark-green solution is boiled, filtered and the dyestuff is salted out. It precipitates in the form of dark-green flakes which are filtered and washed with a hot dilute solution of sodium chloride. The dried dyestuff is a dark-green powder which dissolves in water to a green solution and substantively dyes cotton and viscose artificial silk clear green shades.

(3) If the isatin of Example 1 is replaced by the 6-methylisatin, a corresponding condensation product is formed; on acidifying, it precipitates in red-brown flakes from the yellow alkaline solution and constitutes, when recrystallized from glacial acetic acid, a red-brown powder which sinters with darkening of its color at a temperature above 200° C. and which decomposes at a temperature of about 225° C.

100 parts of caustic potash are heated in a reflux apparatus with an excess of ethyl alcohol until a clear solution has been formed. Thereupon, 10 parts of the condensation product from aceanthrenone and 6-methylisatin are introduced, whereby there is first formed a yellow, greenish fluorescent solution. The whole is further heated in a still and the temperature is slowly raised to about 200° C. The melt slowly assumes a dark-green color and finally the dyestuff formed separates in the form of a dark-green mass floating on the caustic potash. The dyestuff is separated from the alkali, dissolved in water and eliminated from the green solution by means of sodium chloride. It has properties very similar to those of the dyestuff obtained according to Example 1; it dyes cotton, according to the usual dyeing prescriptions, substantively very clear green tints from an aqueous solution.

(4) Similar products may be obtained from the condensation products of aceanthrenone with mono- or di-chlor-or bromisatins, alkylisatins or halogenalkylisatins.

We claim:

1. The process which comprises boiling in alcohol, in the presence of an alkali, aceanthrenone with a compound of the group consisting of isatin, halogen isatins and methyl isatins and melting the condensation product with caustic alkali.

2. The process which comprises condensing aceanthrenone with a compound of the group consisting of isatin, halogen isatins and methyl isatins by boiling the components in alcohol in the presence of strong caustic soda solution and heating the condensation product in a melt of caustic potash in ethyl alcohol.

3. The process which comprises condensing aceanthrenone with isatin by boiling for aboout 24 hours the components in alcohol in the presence of caustic soda solution of 40° Bé. and heating slowly up to about 200° C. the condensation product after its separation, in a melt of caustic potash in ethyl alcohol.

4. The process which comprises condensing aceanthrenone with 5.7-dichlorisatin by boiling for about 24 hours the components in alcohol in the presence of caustic soda solution of 40° Bé. and heating slowly up to about 190° C. the condensation product after its separation, in a melt of caustic potash in ethyl alcohol.

5. The process which comprises condensing aceanthrenone with 6-methylisatin by boiling for about 24 hours the components in alcohol in the presence of caustic soda solution of 40° Bé. and heating slowly up to about 200° C. the condensation product after its separation in a melt of caustic potash in ethyl alcohol.

6. The compound identical with those which are obtained by the process which comprises boiling in alcohol, in the presence of an alkali, aceanthrenone with a compound of the group consisting of isatin halogen isatins and methyl isatins and melting the condensation product with caustic alkali being substantive dyestuffs which dye the vegetable fiber clear green shades.

7. The compounds identical with those which are obtained by the process which comprises condensing aceanthrenone with a compound of the group consisting of isatin halogen isatins and methyl isatins by boiling the components in alcohol in the presence of strong caustic soda solution and heating the condensation product in a melt of caustic potash in ethyl alcohol being substantive dyestuffs which dye the vegetable fiber clear green shades.

8. The compound identical with that which is obtained by the process which comprises condensing aceanthrenone with isatin by boiling for about 24 hours the components in alcohol in the presence of caustic soda solution of 40° Bé. and heating slowly up to about 200° C. the condensation product after its separation, in a melt of caustic potash in ethyl alcohol being a substantive dyestuff which dyes cotton and viscose artificial silk clear green shades.

9. The compound identical with that which is obtained by the process which comprises condensing aceanthrenone with 5.7-dichlorisatin by boiling for about 24 hours the components in alcohol in the presence of caustic soda solution of 40° Bé. and heating slowly up to about 190° C. the condensation product after its separation in a melt of caustic potash in ethyl alcohol being a substantive dyestuff which dyes cotton and viscose artificial silk clear green shades.

10. The compound identical with that which is obtained by the process which comprises condensing aceanthrenone with 6-methylisatin by boiling for about 24 hours the components in alcohol in the presence of caustic soda solution of 40° Bé. and heating slowly up to about 200° C. the condensation product after its separation, in a melt of caustic potash in ethyl alcohol being a substantive dyestuff which dyes cotton and viscose artificial silk clear green shades.

WILHELM ECKERT.
OTTO BRAUNSDORF.